United States Patent [19]

Wakayama et al.

[11] 4,449,021

[45] May 15, 1984

[54] VACUUM CIRCUIT BREAKER

[75] Inventors: Hideaki Wakayama; Jyunji Fujiwara; Kanya Doi, all of Tokyo, Japan

[73] Assignee: Tokyo Shibaura Denki Kabushiki Kaisha, Kawasaki, Japan

[21] Appl. No.: 351,874

[22] Filed: Feb. 24, 1982

[30] Foreign Application Priority Data

Mar. 6, 1981 [JP] Japan .................................. 56-31262

[51] Int. Cl.$^3$ ............................................. H01H 33/66
[52] U.S. Cl. ............................ 200/144 B; 200/50 AA
[58] Field of Search ......................... 200/144 B, 50 AA

[56] References Cited

FOREIGN PATENT DOCUMENTS 43-3241  2/1968  Japan ............................... 200/144 B Primary Examiner—Robert S. Macon Attorney, Agent, or Firm—Oblon, Fisher, Spivak, McClelland & Maier

[57] ABSTRACT

A vacuum circuit breaker comprises a base, a support frame and an insulating frame. The insulating frame has a plurality of housing portions juxtaposed and separated from one another. These housing portions are made of plastics as a unit. The insulating frame is supported by the support frame which is detachably mounted on the base. The vacuum circuit breaker has a plurality of vacuum valves each having a fixed and a movable electrode, and plural sets of main circuit conductors. Each vacuum valve and each set of the main circuit conductors are provided in each housing portion. The vacuum circuit breaker has a operating mechanism moving the movable electrode of the vacuum valve, and the operating mechanism is supported by the support frame.

10 Claims, 18 Drawing Figures

VACUUM CIRCUIT BREAKER

BACKGROUND OF THE INVENTION

The present invention relates to a vacuum circuit breaker for use in the electric power substation, equipment for controlling the opening and closing of industrial powers, and the like.

Figure 1:
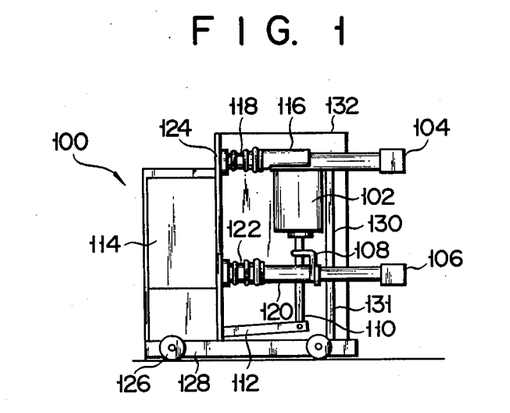
FIG. 1 is a side view showing the conventional vacuum circuit breaker.

FIG. 1 shows a conventional vacuum circuit breaker. A vacuum circuit breaker 100 includes a vacuum interrupter or valve 102 provided with fixed and movable electrodes, and main circuit conductors 104 and 106. The fixed electrode of the vacuum valve 102 is electrically connected to the main circuit conductor 104 while the movable electrode thereof to the main circuit conductor 106 via a flexible conductor 108, thus forming a main circuit line. The movable electrode of the vacuum valve 102 is connected through an insulating rod 110 and a link 112 to an operating mechanism 114, which is operated to cause the movable electrode to close and open the main circuit line. The fixed electrode and the main circuit conductor 104 of the vacuum valve 102 are fixed via a support 116 to one end of a support insulator 118 while the main circuit conductor 106 thereof via a support 120 to one end of a support insulator 122. The operating mechanism 114 is attached to an attachment plate 124, which is formed integral to a base 128 provided with wheels 126. The other ends of the support insulators 118 and 122 are fixed to the attachment plate 124, respectively. The support insulators 118 and 122 mechanically support but electrically insulate the vacuum valve 102. Since the vacuum valve 102 is cantilever-supported relative to driving force applied from the operating mechanism 114 to close and open the vacuum valve in the arrangement as described above, the main circuit conductors 104 and 106 are connected integrally with the base 128 by means of reinforcing insulating studs 130 and 131. The vacuum circuit breaker 100 has a plurality of vacuum valves, for example, two vacuum valves, having such arrangement as described above. The vacuum circuit breaker 100 thus formed is required to have a predetermined insulating distance between two adjacent vacuum valves 102 so as to resist voltage the employed. When the insulating distance is set using atmosphere, the whole of vacuum circuit breaker becomes large-sized. Therefore, an insulating barrier 132 is arranged between two adjacent vacuum valves 102 to make the vacuum circuit breaker 100 small-sized. This insulating barrier 132 is attached to the attachment plate 124 and the base 128 by means of metal fittings.

As described above, the insulating barrier, reinforcing insulating stud, support insulator, support and the like are formed as separate individual members and these thus formed are assembled with one another to form the conventional vacuum circuit breaker. Therefore, the conventional vacuum circuit breaker is large in number of its parts, troublesome in adjusting their dimensions, difficult in assembling them and high in cost. In addition, the attachment plate to which the vacuum valve, operating mechanism and the like are attached and which is formed integral to the base makes it difficult to apply the conventional vacuum circuit breaker to enclosed switchgears tiered in one or two stages by changing the height of main circuit conductors therein.

SUMMARY OF THE INVENTION

The present invention is therefore intended to eliminate above-mentioned drawbacks.

The object of the present invention is to provide a vacuum circuit breaker capable of adjusting the relative arrangement of its parts, excellent in its assembling capability and production cost, and capable of easily adjusting the height of the main circuit conductors.

According to one aspect of the present invention, the vacuum circuit breaker comprises a base, a support frame and an insulating frame. The insulating frame has a plurality of housing portions juxtaposed and separated from one another by a predetermined distance. These housing portions are formed integral to one another and made of plastics. The insulating frame is supported by the support frame, which is detachably arranged on the base. The vacuum circuit breaker has a plurality of vacuum valves each having a fixed electrode and a movable electrode, and plural sets of main circuit conductors. Each vacuum valve and each set of the main circuit conductors are supported in each of the housing portions. Further, the vacuum circuit breaker has operating means moving the movable electrode to close and open the vacuum valve, and the operating means is supported by the support frame.

According to the vacuum circuit breaker of the present invention, each vacuum valve and each set of main circuit conductors are supported in each of housing portions which are formed integral to one another to construct the insulating frame. Therefore, the vacuum circuit breaker of the present invention makes it unnecessary to use the conventional support insulators, insulating barrier, insulating studs, supports and the like, thus allowing the number of parts employed to be made smaller. The vacuum circuit breaker according to the present invention therefore makes it easily to precisely control dimensions of its parts and is excellent in its assembling capability and production cost. In addition, the support frame for supporting the insulating frame and the operating means is detachably attached to the base according to the vacuum circuit breaker of the present invention. The support frame can be therefore easily detached from the base to easily adjust the height of the vacuum valves.

BRIEF DESCRIPTION OF THE DRAWINGS

FIGS. 2 through 18 show an example of vacuum circuit breaker according to the present invention, in which;

DETAILED DESCRIPTION OF THE PREFERRED EMBODIMENT

A preferred embodiment of the present invention will be described in detail referring to the drawings.

Figure 2:
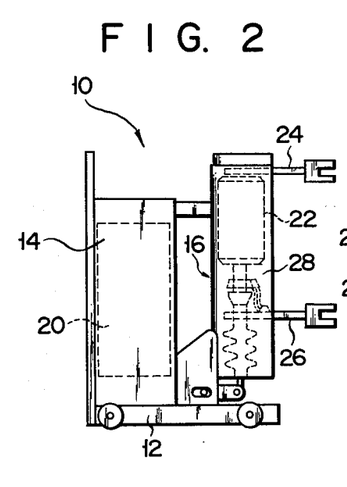
FIGS. 2 and 3 are side and front views showing the vacuum circuit breaker.
Figure 3:
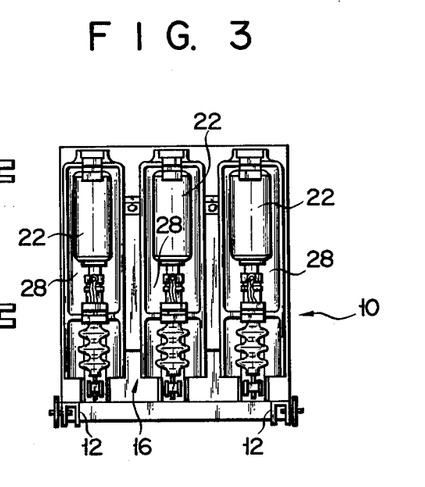

As shown in FIGS. 2 and 3, a vacuum circuit breaker 10 includes a movable base 12, a support frame 14 detachably arranged on the base 12, and an insulating frame 16 supported by the support frame 14. The support frame 14 supports operating means 20. The insulating frame 16 supports three vacuum valves 22 and three sets of main circuit conductors 24, 26, and mechanically supports but electrically insulates them. The closing and opening of the vacuum valve 22 is achieved by the operating means 20.

Figure 4:
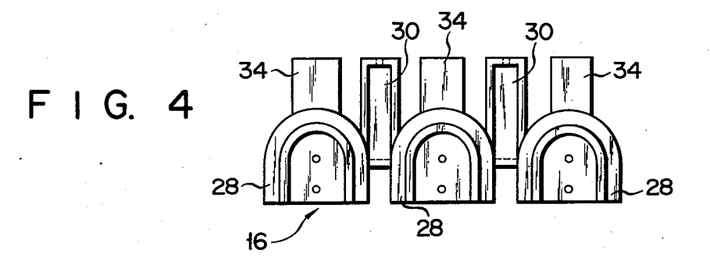
FIGS. 4 and 5 top and front views showing an insulating frame.
Figure 5:
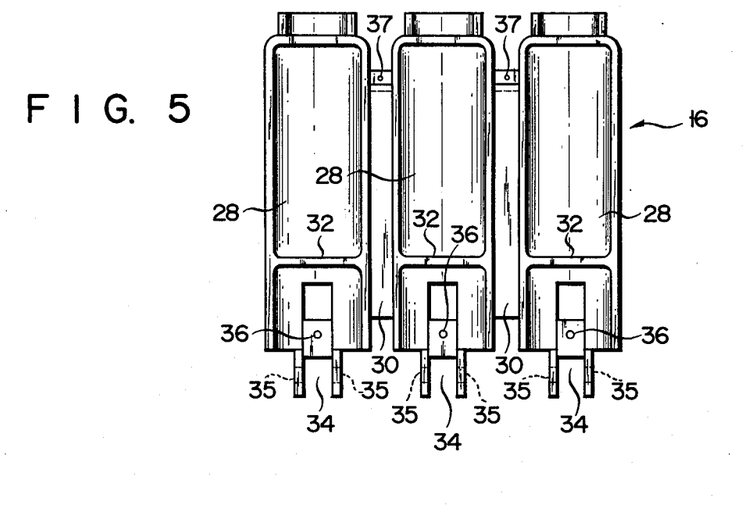
Figure 6:
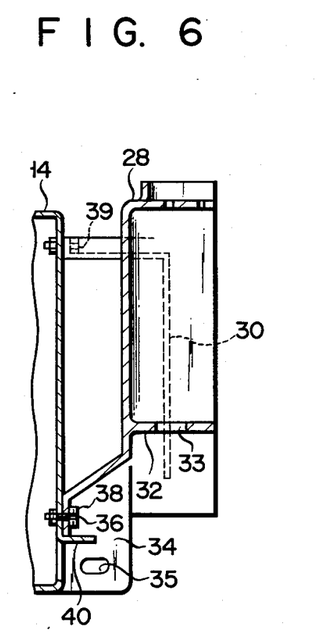
FIG. 6 a longitudinal sectional view showing how the insulating frame is attached to a support frame, FIG. 7 a partially cutaway side view, schematically showing how one vacuum valve and main circuit conductors are housed in each housing portion of the insulating frame, FIGS. 8 through 10 back, side and front views schematically showing a part of operating means, FIGS. 11 and 12 side and bottom views schematically showing the other part of operating means, FIGS. 13 and 14 front and side views showing how the support frame is attached to a base, FIGS. 15 and 16 side and front views showing the vacuum circuit breaker whose height is changed, and FIGS. 17 and 18 front and side views schematically showing the vacuum circuit breaker of vertically lifted type.

As shown in FIGS. 4 through 6, the insulating frame 16 has three housing portions 28 juxtaposed and separated from one another by a predetermined distance, and also has connecting portions 30 for connecting two adjacent housing portions with each other. These housing and connecting portions 28 and 30 are formed integral to one another and made of plastics. Each of the housing portions 28 is formed to cover the upper, lower and three lateral sides of the vacuum valve 22, and the remaining one lateral side is opened to facilitate to attach/detach the vacuum valve thereto. Each of the housing portions 28 has a partition wall 32 in which a through-hole 33 is formed. Each housing portion 28 also has a supporting portion 34 extending backwards and downwards therefrom, horizontally extending oval slots 35 formed in the opposite walls thereof and a fixing hole 36 formed in the back wall thereof. The upper portion of each connecting portion 30 is horizontally extended backwards and has a fixing hole 37 formed in the extended end thereof.

As apparent from FIG. 6, the insulating frame 16 is supported by the support frame 14. The supporting portions 34 are fixed by screwing bolts 38 through the fixing holes 36 while the connecting portions 30 by screwing bolts 39 through the fixing holes 37 to the support frame 14. The supporting portions 34 are also supported by flanges 40 stamp-formed from the support frame 14, thus allowing bolts to be made smaller-sized, the number of fixing points to be reduced, and stress to be prevented from concentrating on bolt holes.

Figure 7:
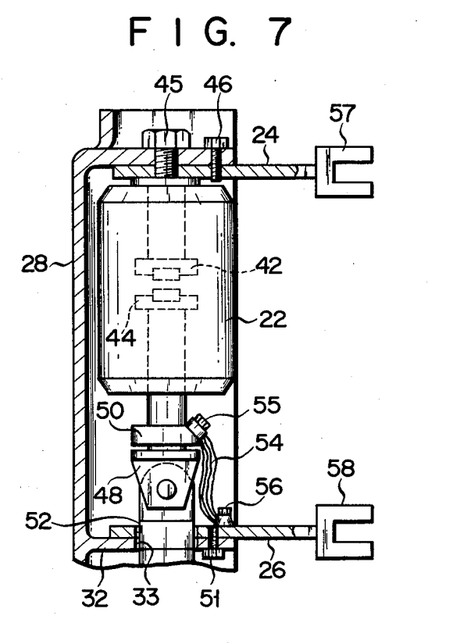

As shown in FIG. 7, one vacuum valve 22 and main circuit conductors 24, 26 are provided in each housing portion 28 of the insulating frame 16. This vacuum valve 22 has a fixed electrode 42 and a movable electrode 44. The fixed electrode 42 is fixed to the upper side of the housing portion 28 by means of a bolt 45 screwed through the main circuit conductor 24, which is further fixed to the upper side of the housing portion 28 by a bolt 46. The movable electrode 44 has a coupling 48 and a conductor 50 fixed thereto at the lower end thereof. The main circuit conductor 26 is fixed to the partition wall 32 of the housing portion 28 by means of a bolt 51 and has a through-hole 52 positioned coaxially with the through-hole 33 formed in the partition wall 32. The movable electrode 44 and main circuit conductor 26 are electrically connected to each other through the conductor 50 and a flexible conductor 54. One end of the flexible conductor 54 is fixed by a bolt 55 to the conductor 50 while the other end thereof by a bolt 56 to the main circuit conductor 26. The bolt 55 is screwed into the conductor 50 at such an angle as to allow its screwing and unscrewing to be easily achieved through the front of the housing portion 28 and the flexible conductor 54 to keep its flexibility. Fingers 57 and 58 are attached to the projected ends of the main circuit conductors 24 and 26, respectively.

As described above, each housing portion 28 contains a vacuum valve 22, two main circuit conductors 24, 26 and a flexible conductor 54 which form a main circuit line. The housing portions 28 are made integral to one another and constitute the insulation frame 16. Hence, any two adjacent main circuit lines are electrically insulated from each other by two walls, i.e. the walls of the housing portions 28 which contain them. Each main circuit line can thus be more effectively insulated from another than in the conventional vacuum circuit breaker even if the distance between it and the adjacent one is shorter than in the conventional vacuum circuit breaker. The vacuum circuit breaker 10 can therefore be make smaller than the conventional one. Since the insulating frame 16 is constituted by three housing portions 28 which are made integral, it performs the functions of the support insulators, insulating barrier, insulating studs, supports and the like necessarily used in the conventional vacuum circuit breaker. Accordingly, the vacuum circuit breaker 10 does not require such members. This leads to reduction of the number of parts.

Figure 8:
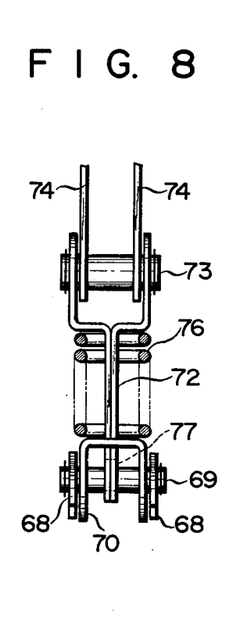
Figure 9:
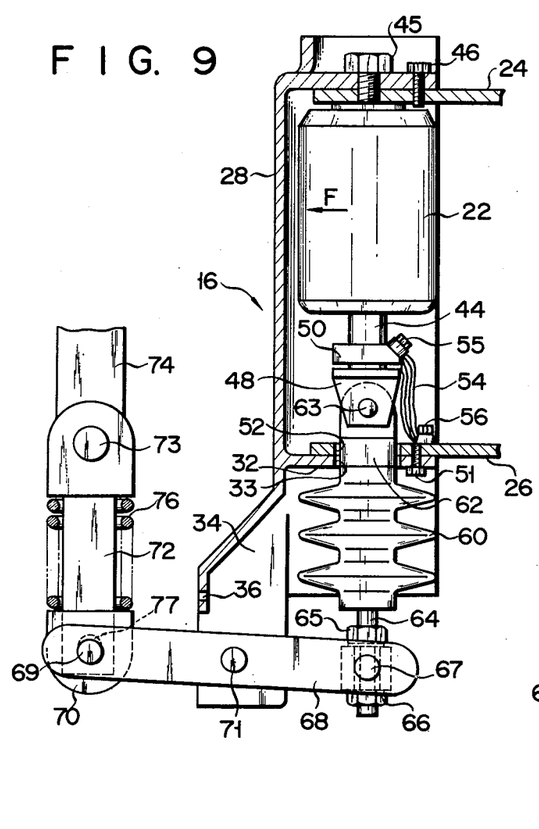
Figure 10:
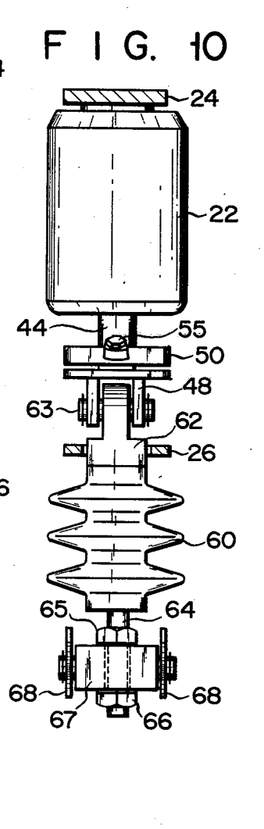

FIGS. 8 through 10 show the operating means 20 for closing and opening the vacuum valve 22. An insulating rod 60 has at the upper end thereof a stud 62 formed integral thereto and the stud 62 is attached by means of a pin 63 to the coupling 48 fixed to the movable electrode 44. The stud 62 penetrates through the holes 33 and 52 of the partition wall 32 and the main circuit conductor 26 and has a outer diameter a little smaller than inner diameters of through-holes 33 and 52. The insulating rod 60 also has at the lower end thereof another stud 64 formed integral thereto and the stud 64 is fixed to a pin 67 by means of adjusting nuts 65 and 66. The pin 67 is rotatably connected to one end portion of a paired link 68 arranged parallel to each other. The other end portion of the link 68 is swingably connected to a first support 70 by means of a pin 69 and the center portion of the link 68 is supported to the supporting portion 34 of the insulating frame 16 by means of a pin 71 so that the link 68 may be swingable around the pin 71. The support 70 is connected to the lower end portion of a second support 72 by means of the pin 69 and the support 72 is swingably connected to a paired link 74 by means of a pin 73. The link 74 is connected to a driving mechanism, for example, motor-spring operating mechanism (not shown) of the operating means 20 and moves the movable electrode 44 through the supports 72, 70, link 68 and insulating rod 60. A contact spring 76 is interposed between supports 70 and 72 and applies contact pressure between the electrodes in the vacuum valve 22 through the link 68 and insulating rod 60. The contact pressure can be adjusted by turning both nuts 65 and 66, thus changing the position of the pin 67 relative to the stud 64 and changing the force of the spring 76. The pin 69 which connects supports 70 and 72 is supported by an oval hole 77 formed in the support 72. The oval hole 77 is formed long along the axis of support 72, thus allowing the support 70 to move along the axis of the support 72. The moving range of the support 70, that is, the longitudinal length of the oval hole 77 is set larger than the wear amount of the electrodes so as for the spring 76 to apply a predetermined contact pressure between the electrodes even in the case where the contacting portion of each electrode in the vacuum valve 22 is worn to a predetermined value.

Figure 11:
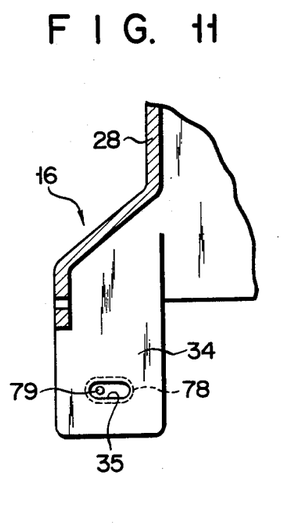
Figure 12:
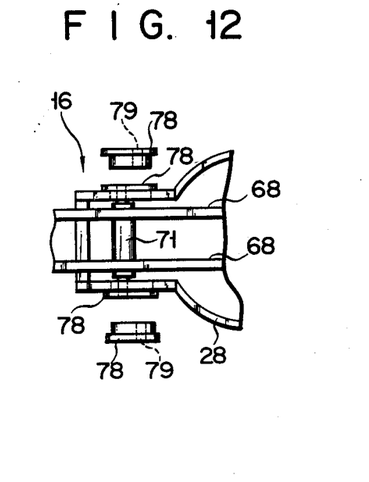

As shown in FIGS. 11 and 12, the pin 71 which supports the center of the link 68 is supported by a pair of bushes 78. The bushes 78 are detachably inserted respectively into the oval holes 35 formed in the supporting portion 34 of the insulating frame 16. Each bush 78 has a supporting hole 79 for supporting the pin 71 and is formed oval corresponding to the oval hole 35. As well shown in FIGS. 11 and 12, each bush 78 can be inserted into the oval hole 35, turned through 180°.

It is generally necessary that the vacuum circuit breaker change a distance between electrodes in the vacuum valve to correspond to voltage employed. The adjustment of the distance between electrodes is achieved by exchanging the operating mechanism, shown in FIG. 2, with other new mechanism of changing the supporting position of the pin 71 which is the supporting point of the link 68 in FIG. 9, for example. However, the former is not preferable in cost and production because it needs other new mechanism while the latter is inferior in speedy operation because it needs to form holes every time when the supporting position of the pin 71 is to be changed.

According to the vacuum circuit breaker 10 of the embodiment, the pin 71 which supports the link 68 is inserted into the supporting holes 79 of the bushes 78 to be supported by the same. Each bush 78 can be inserted into the oval hole 35 of the insulating frame 16, turned through 180°. The supporting hole 79 of the bush 78 is formed at such a position that the hole 79 is horizontally shifted by a predetermined distance when the bush 78 is turned through 180°. Therefore, the supporting position of the pin 71 can be easily changed by turning the bushes 78 through 180°, thus enabling the gap between the electrodes in the vacuum valve 22 to be easily adjusted.

According to the operating means 20 having such arrangement as described above, the connection between the coupling 48 fixed movable electrode 44 and the stud 62 of the insulating rod 60 is attained only by the pin 63, as shown in FIG. 9, so that the movable electrode 44 and insulating rod 60 can be easily released from each other only by removing the pin 63. The flexible conductor 54 which electrically connects the movable electrode 44 to the main circuit conductor 26 is fixed to the conductor 50 by the bolt 55, which is screwed into the conductor 50 at such an angle as allows the bolt 55 to be easily detached through the front of the insulating frame 16, as already described above. Therefore, the vacuum valve 22 can be easily exchanged with a new one only by removing the pin 63, bolts 55 and 45. The stud 62 penetrates through the holes 33 and 52 of the partition wall 32 and main circuit conductor 26 and has a outer diameter a little smaller than inner diameters of the holes 33 and 52, so that the stud 62 is guided by these through-holes 33 and 52. Even in the case where large current flows to the main circuit line causing electromagnetic force to act on the vacuum valve 22 in a direction shown by an arrow F, for example, the stud 62 is supported by the circumferential edges of the through-holes 33 and 52 to function as a supporting member for the vacuum valve, thus preventing the movable electrode 44 and the members attached to the electrode 44 from being bent. Therefore, no other supporting member is needed to support the vacuum valve, thus reducing the number of parts employed to form the vacuum circuit breaker.

Figure 13:
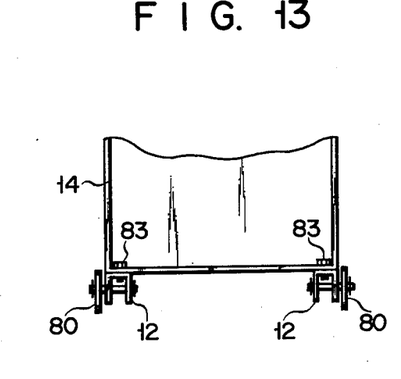
Figure 14:
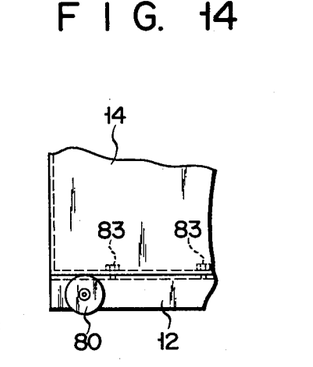

As shown in FIGS. 13 and 14, the support frame 14 is arranged on a movable base 12 having wheels 80, and detachably fixed to the base 12 by means of plural bolts 83. The support frame 14 can be therefore easily detached from the base 12 only by removing the bolts 83.

Figure 15:
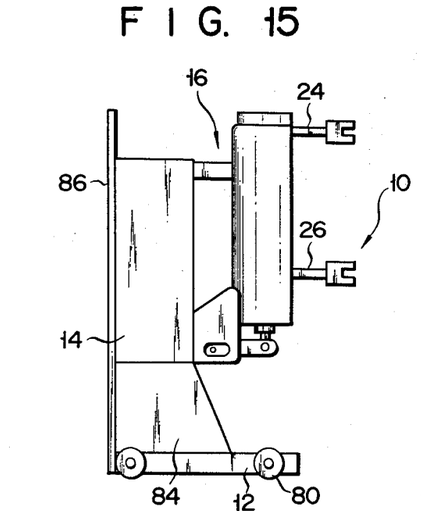
Figure 16:
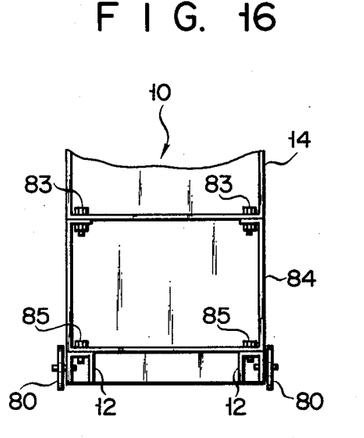

FIGS. 15 and 16 show the vacuum circuit breaker 10 whose main circuit conductors 24 and 26 are lifted. In this state, the support frame 14 is mounted on an auxiliary frame 84. The auxiliary frame 84 is detachably attached to the base 12 by means of bolts 85 and the support frame 14 is detachably attached onto the auxiliary frame 84 by the bolts 83.

The vacuum circuit breaker 10 whose main circuit conductors 24 and 26 are lifted can be applied to enclosed switchgears tiered in one stage. As described above, the support frame 14 can be easily detached from the base 12 and the insulating frame 16 and operating means 20 are supported by the support frame 14, said insulating frame 16 supporting the vacuum valve and main circuit conductors which form the main circuit line. The height of the main circuit conductors 24 and 26 can be therefore easily changed only by interposing the auxiliary frame 84 between the support frame 14 and the base 12 without removing the vacuum valve and the like. The vacuum circuit breaker 10 can be thus applied to various kinds of enclosed switchgears and has excellent applicability and speedy conformity. Reference numeral 86 denotes a cover in FIG. 15.

Figure 17:
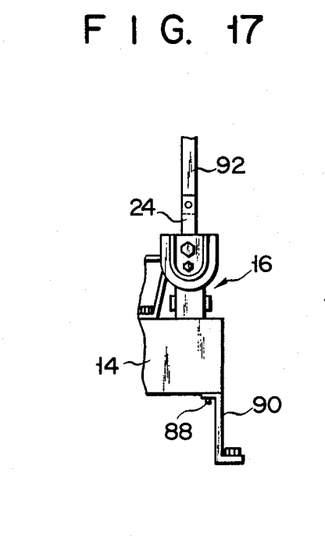
Figure 18:
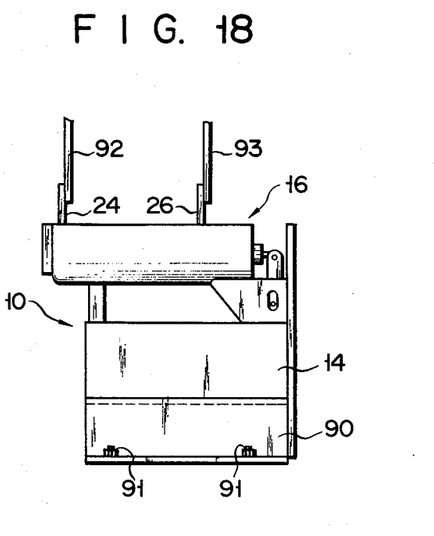

FIGS. 17 and 18 show the vacuum circuit breaker 10 whose main circuit conductors are arranged in vertical shape. The support frame 14 is detachably attached to a fixing frame 90 by means of bolts 88 using cover attaching holes. The fixing frame 90 is fixed onto the ground by bolts 91. Instead of the fingers, terminals 92 and 93 are attached to the main circuit conductors 24 and 26, respectively.

As already described above, the support frame 14 can be easily detached from the base 12, and the insulating frame 16 and operating means 20 are supported by the support frame 14. Therefore, the vacuum circuit breaker 10 can be easily changed to the one whose main circuit conductors are arranged in vertical shape by removing the base 12 to be replaced by the fixing frame 90 and exchanging the fingers with the terminals 92 and 93. When the vacuum circuit breaker is changed to the one whose main circuit conductors are arranged in vertical shape, the space occupied by the vacuum circuit breaker can be made smaller.

What we claim is:
1. A vacuum circuit breaker comprising:
a base;
an insulating frame having a plurality of housing portions juxtaposed and separated from one another by a predetermined distance and a connecting portion for connecting adjacent housing portions, said insulating frame being made of plastic as a unit;
a plurality of vacuum interrupters each having a fixed electrode and a movable electrode and being rigidly supported in one of the respective housing portions, each housing portion being formed to cover the upper, lower and three lateral sides of the vacuum interrupter and having an open front to allow the vacuum interrupter to be easily exchanged with a new one therethrough;

a plurality of pairs of main circuit conductors, one said pair being provided for each of said housing portions and being rigidly supported in the respective housing portions, the main circuit conductors of each said pair connected to the fixed and movable electrodes of each vacuum interrupter;

a support frame detachably mounted on the base and supporting the insulating frame, the support frame being arranged at a backside of the insulating frame, said backside being opposite said open front; and an operating means supported by the support frame for moving the movable electrodes of said vacuum interrupters.

2. A vacuum circuit breaker according to claim 1, wherein said operating means has operating members each of which is rockably supported by the housing portion by means of a pin, one end of which is connected to the movable electrode to move the same, and which further comprises an adjusting mechanism for adjusting the distance between the fixed and movable electrodes, the mechanism including an elongated slot formed in the housing portion, and an elongated bush which is detachably fitted in the slot such that the bush can be turned through 180° and having a support hole into which the pin supporting the operating member is inserted, the position of the support hole being shifted along the longitudinal direction of the bush by a predetermined distance when the bush is turned through 180°, whereby the distance between the fixed and movable electrodes is adjusted.

3. A vacuum circuit breaker according to claim 1, wherein said support frame which supports said operating means and insulating frame includes an auxiliary frame detachably mounted on said base and supporting the support frame.

4. A vacuum circuit breaker according to claim 3, wherein said support frame has flanges stamp-formed therefrom and said insulating frame is attached to the support frame by bolts and supported by the flanges.

5. A vacuum circuit breaker according to claim 1, wherein each of said housing portions has a partition wall opposite to an upper inner surface of the housing portion, one of the main circuit conductors being fixed to a surface of the partition wall which is opposite to said upper inner surface of the housing portion, the other main circuit conductor being fixed to an upper inner surface of the housing portion, and the main circuit conductors extend forward through said open front of the housing portion.

6. A vacuum circuit breaker according to claim 5, wherein said movable electrode is electrically connected to the main circuit conductor by means of a flexible conductor.

7. A vacuum circuit breaker according to claim 6, wherein the fixing of said flexible conductor to said movable electrode is achieved by a bolt screwed at such an angle as allow the bolt to be easily detached through the opened front of said housing portion.

8. A vacuum circuit breaker according to claim 7, wherein each of said housing portions has a supporting portion extending backwards and downwards therefrom and having opposite walls; and said operating means includes an insulating rod connected to the movable electrode, a pair of links which are rockably supported by the opposite walls of the supporting portion and one end portion of which is connected to the insulating rod, a first support connected to the other end portion of the paired link, a second support connected to the first support, a contact spring interposed between the first and second supports to apply contacting pressure to the movable electrode via the pair of links and insulating rod, and a driving mechanism connected to the second support.

9. A vacuum circuit breaker according to claim 8, wherein said partition wall and main circuit conductor fixed to the partition wall have through holes, the insulating rod has a stud connected to the movable electrode by a pin, and the stud penetrates through the through holes, thereby being guided.

10. A vacuum circuit breaker according to claim 9, wherein said second support has an oval hole longer in the axial direction thereof and said first support is connected to said second support by means of this oval hole and a pin so as to move in the axial direction of said second support.

* * * * *